Nov. 24, 1959     H. N. QUOSS     2,913,782
COMBINED THRESHOLD AND SEALING STRIP
Filed Oct. 30, 1957

INVENTOR
Henry N. Quoss

BY

ATTORNEY

United States Patent Office 2,913,782
Patented Nov. 24, 1959

2,913,782

COMBINED THRESHOLD AND SEALING STRIP

Henry N. Quoss, Dallas, Tex.

Application October 30, 1957, Serial No. 693,344

3 Claims. (Cl. 20—64)

This invention relates to a combined threshold and sealing strip, and it concerns more particularly a strip for use as a threshold, and for sealing the space below the lower end of a door.

An object of the invention is to provide a composite strip for use as a threshold, and for sealing the space below the lower end of a door, having a principal component comprising a shaped strip formed of molded resilient material and having a pair of shaped strips formed of rigid material, coextensive with the longitudinal edges of the first strip, attached to marginal portions of the first strip for use in stiffening the marginal portions and for anchoring them to a floor or sill.

Another object of the invention is to provide a composite strip of the type described in which the strips formed of rigid material are received in interlocking grooves provided therefor in marginal portions of the resilient component of the strip.

Another object of the invention is to provide a composite threshold and sealing strip comprising, in combination with a shaped strip formed of molded resilient material and having marginal threshold portions, coextensive with its longitudinal edges, adapted to be supported upon a floor or sill, and a relatively thin, arched sealing portion intermediate the marginal portions capable of being flexed upwardly, for sealing engagement with the lower end of a door, upon advancing the marginal portions relative to each other, shaped strips formed of rigid material received in interlocking grooves provided therefor in the marginal portions for use in stiffening the marginal portions and for anchoring them to the floor or sill.

The invention will be readily understood by referring to the following description and the accompanying drawing, in which.

Figure 1:
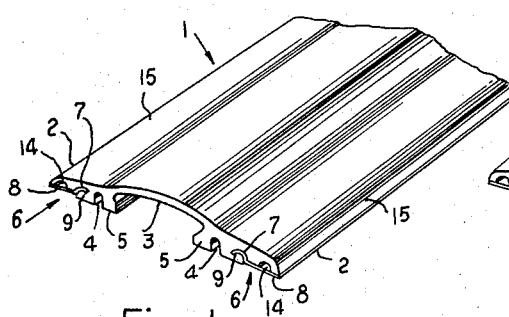
Figure 1 is a perspective view of a combined threshold and sealing strip embodying the invention.
Figure 3:
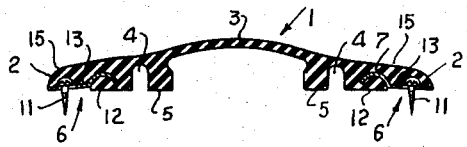
Figure 3 is a transverse sectional elevational view of the invention as shown in Figure 1.

Referring to the embodiment of the invention shown in Figures 1 and 3 of the drawing, the numeral 1 designates generally a shaped strip formed of molded resilient material. The strip 1 has marginal threshold portions 2, coextensive with its longitudinal edges, adapted to be supported upon a floor or sill, and a relatively thin, arched sealing portion 3 intermediate the marginal portions 2 capable of being flexed upwardly, for sealing engagement with the lower end of a door, upon advancing the marginal portions 2 relative to each other.

The marginal portions 2 are of equal width. Each of the marginal portions 2 has a longitudinal groove 4 formed in its under side and defining a longitudinal rib 5, which is positioned below the adjacent longitudinal edge of the arched sealing portion 3, at its junction with the marginal portion 2.

A pair of shaped strips 6, which are formed of rigid material, such as metal or plastic, are each received in a corresponding longitudinal groove 7 provided therefor in the under side of one of the marginal portions 2 for use in stiffening the marginal portion 2 and for anchoring it to a floor or sill.

Figure 8:
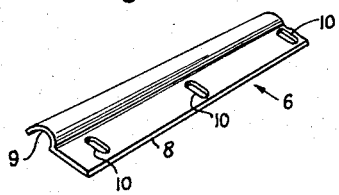
Figure 8 is a perspective view of a shaped strip formed of rigid material receivable in an interlocking groove provided therefor in a marginal portion of the resilient component of the composite strip of the invention.

As shown best in Figure 8, the strips 6 each have a flat portion 8, which comprises substantially one-half of its width, for engagement with the floor or sill, and an arcuate portion 9, comprising substantially the remaining one-half of its width, for engagement with the corresponding longitudinal groove 7. A plurality of longitudinally spaced elongated transverse openings 10 are formed in the flat portion 8 of the strip 6 for engagement by screws 11 whereby the strip 6 is anchored to the floor or sill.

The longitudinal grooves 7 are spaced inwardly from the adjacent longitudinal edges of the strip 1, and are arcuate in transverse section whereby they conform to the shape of the arcuate portions 9 of the strips 6. Each of the grooves 7 defines a bead 12 positioned below it, the bead 12 having an arcuate upper surface for engagement by the under side of the arcuate portion 9 of one of the strips 6.

The under sides of the marginal portions 2 are each recessed between the adjacent longitudinal edge of the strip 1 and the groove 7, as at 13, for engagement by the upper surface of the flat portion 8 of one of the strips 6. Longitudinal grooves 14 are formed in the under sides of the marginal portions 2 adjacent the longitudinal edges of the strip 1 for engagement by the heads of the screws 11. The marginal portions 2 above the beads 12 and the recesses 13 comprise flaps 15, which are capable of being raised for the purpose of attaching the strips 6 to the floor or sill.

Figure 2:
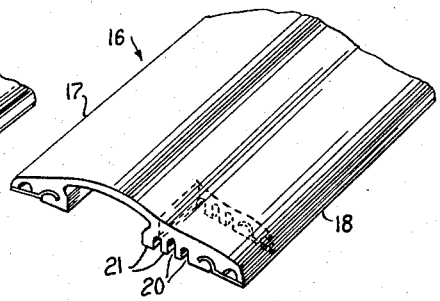
Figure 2 is a perspective view of another form of the invention.
Figure 4:
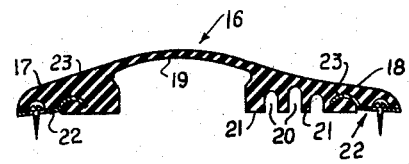
Figure 4 is a transverse sectional elevational view of the form of the invention shown in Figure 2.

Referring to the form of the invention shown in Figures 2 and 4, the numeral 16 designates generally a shaped strip formed of molded resilient material, which corresponds to the strip 1 shown in Figures 1 and 3. The strip 16 has marginal threshold portions 17 and 18, which correspond to the marginal threshold portions 2 shown in Figures 1 and 3, and a relatively thin, arched sealing portion 19, which corresponds to the arched sealing portion 3 of Figures 1 and 3. The marginal threshold portion 18 is substantially wider than the marginal threshold portion 17.

A plurality of longitudinal grooves 20, which define longitudinal ribs 21, are formed in the under side of the marginal portion 18.

A pair of shaped metal strips 22, which correspond to the strips 6 of Figures 1 and 3, are each received in a corresponding longitudinal groove 23 provided therefor in the under side of one of the marginal portions 17 and 18.

Figure 5:
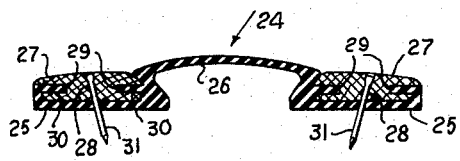
Figure 5 is a transverse sectional elevational view showing another form of the invention.

Figure 5 shows a modified form of the invention which includes a shaped strip 24, formed of molded resilient material, corresponding to the strip 1 of Figures 1 and 3, and having marginal threshold portions 25 corresponding to the marginal threshold portions 2 of Figures 1 and 3, and a relatively thin, arched sealing portion 26, which corresponds to the arched sealing portion 3 of Figures 1 and 3.

A pair of shaped wood strips 27, which correspond to the strips 6 of Figures 1 and 3, are each received in a coresponding longitudinal groove 28 provided therefor in the upper surface of one of the marginal portions 25. Longitudinal grooves 29 are formed in opposite sides of the strips 27 for engagement by corresponding ribs 30 formed in the sides of the grooves 28. Nails 31 are driven through the strips 27 and the marginal portions 25 below the grooves 28 to secure the strip 24 to a floor or sill.

Figure 6:
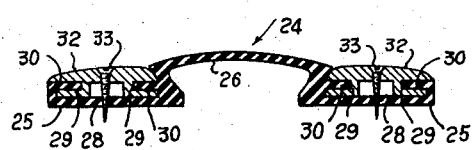
Figure 6 is a transverse sectional elevational view of another form of the invention.

Figure 6 shows an arrangement similar to that of Figure 5 in which metal strips 32, which correspond to the wood strips 27 of Figure 5, are secured to a floor or sill by screws 33, which correspond to the nails 31 of Figure 5.

Figure 7:
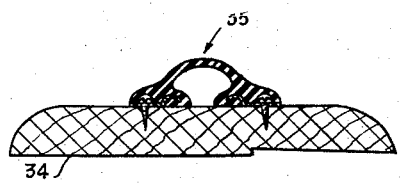
Figure 7 is a transverse sectional elevational view of a conventional threshold having superimposed thereon a strip embodying the invention which is of relatively narrow dimension, for use primarily as a sealing strip.

In Figure 7 a conventional threshold, which is designated by the numeral 34, has a composite strip similar to that of Figures 1 and 3, but of relatively narrow dimension, indicated generally by the numeral 35, superimposed thereon.

Figure 9:
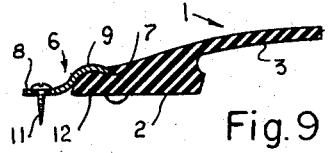
Figure 9 is a fragmentary transverse sectional elevational view showing another form of the invention.

Figure 9 shows an arrangement similar to that of Figures 1 and 3 in which the marginal portions 2 above the beads 12 and the recesses 13, comprising the flaps 15, have been shortened whereby the flaps 15 have been eliminated.

The invention may be modified in various ways without departing from the spirit and scope thereof.

What is claimed is:

1. A composite threshold and sealing strip comprising, in combination with a shaped strip formed of molded resilient material and having marginal threshold portions, coextensive with its longitudinal edges, adapted to be supported on a supporting surface, and a relatively thin, arched sealing portion intermediate the marginal portions capable of being flexed upwardly, for sealing engagement with the lower end of a door, upon advancing the marginal portions relative to each other, a pair of shaped strips formed of rigid material each received in a corresponding longitudinal groove provided therefor in the under side of one of the marginal portions for use in stiffening the marginal portion and for anchoring it to a supporting surface, the rigid strips each having a flat portion, comprising substantially one-half of its width, for engagement with the supporting surface, and an arcuate portion, comprising substantially the remaining one-half of its width, for engagement with the corresponding longitudinal groove.

2. The structure of claim 1, the flat portions of the rigid strips each having a plurality of longitudinally spaced elongated transverse openings therein for engagement by fastening devices whereby the rigid strip is anchored to a supporting surface.

3. The structure of claim 1, the longitudinal grooves being spaced inwardly from the adjacent longitudinal edges of the resilient strip and being arcuate in transverse section whereby they conform to the shape of the arcuate portions of the rigid strips, each of the longitudinal grooves defining a bead positioned below it, the bead having an arcuate upper surface for engagement by the under side of the arcuate portion of one of the rigid strips, the under sides of the marginal portions each being recessed between the adjacent longitudinal edge of the resilient strip and the longitudinal groove for engagement by the upper surface of the flat portion of one of the rigid strips, the marginal portions above the beads and the recesses comprising flaps capable of being raised for the purpose of attaching the rigid strips to the supporting surface.

References Cited in the file of this patent

UNITED STATES PATENTS

| 88,572 | Johnston | Apr. 6, 1869 |
| 100,461 | St. Clair | Mar. 1, 1870 |
| 2,575,657 | Curley | Nov. 20, 1951 |

FOREIGN PATENTS

| 445,049 | Great Britain | Apr. 2, 1936 |